United States Patent
He et al.

(10) Patent No.: US 12,299,457 B2
(45) Date of Patent: May 13, 2025

(54) METHOD AND APPARATUS FOR AWAKENING WEARABLE DEVICE

(71) Applicant: Matrixed Reality Technology Co., Ltd., Wuxi (CN)

(72) Inventors: Yue He, Beijing (CN); Bing Xiao, Beijing (CN); Chi Xu, Beijing (CN)

(73) Assignee: Matrixed Reality Technology Co., Ltd., Jiangsu (CN)

( * ) Notice: Subject to any disclaimer, the term of this patent is extended or adjusted under 35 U.S.C. 154(b) by 449 days.

(21) Appl. No.: 17/420,465

(22) PCT Filed: Dec. 27, 2019

(86) PCT No.: PCT/CN2019/129114
§ 371 (c)(1),
(2) Date: Jul. 2, 2021

(87) PCT Pub. No.: WO2020/140840
PCT Pub. Date: Jul. 9, 2020

(65) Prior Publication Data
US 2022/0084529 A1    Mar. 17, 2022

(30) Foreign Application Priority Data
Jan. 4, 2019    (CN) .......................... 201910007365.X

(51) Int. Cl.
*G06F 9/4401*    (2018.01)
*G06F 3/01*    (2006.01)
(Continued)

(52) U.S. Cl.
CPC ............ *G06F 9/4418* (2013.01); *G06F 3/015* (2013.01); *G06V 40/169* (2022.01);
(Continued)

(58) Field of Classification Search
None
See application file for complete search history.

(56) References Cited

U.S. PATENT DOCUMENTS 10,566,007 B2 *    2/2020    Fawaz ..................... G10L 25/51
11,016,968 B1 *    5/2021    Hoover ................... G10L 15/22
(Continued)

FOREIGN PATENT DOCUMENTS

CN    105487661 A    4/2016
CN    105807913 A    7/2016
(Continued)

OTHER PUBLICATIONS

Ruijian Culture Media (Tianjin) Co., Ltd., Publication Name: AI 说见, Publication Date Aug. 15, 2018; "Baidu" search engine, namely "https://baijiahao.baidu.com/s?id=1608829257787831514&wfr=spider&for=pc".

*Primary Examiner* — Jonathan C Kim

(57) ABSTRACT

The present disclosure relates to method and apparatus for waking up a wearable device. The method includes: determining, based on a detected voice signal, whether the voice signal is from a wearer of the wearable device; determining, based on the voice signal, whether the voice signal belongs to a conversation between the wearer and the wearable device with a speech classification model; and waking up the wearable device when the voice signal is from the wearer and the voice signal belongs to the conversation between the wearer and the wearable device. The method and apparatus can wake up the wearable device during a normal interaction process between the wearer and the wearable device by using the method and apparatus, thereby realizing a natural wake-up process and improving the user experience of the wearable device.

17 Claims, 9 Drawing Sheets

(51) Int. Cl.
*G06V 40/16* (2022.01)
*G06V 40/70* (2022.01)
*G10L 15/22* (2006.01)
*G10L 17/22* (2013.01)

(52) U.S. Cl.
CPC ............ *G06V 40/176* (2022.01); *G06V 40/70* (2022.01); *G10L 15/22* (2013.01); *G10L 17/22* (2013.01)

(56) References Cited

U.S. PATENT DOCUMENTS

| | | | | |
|---|---|---|---|---|
| 11,683,632 | B2* | 6/2023 | Dusan | G10L 25/06 381/110 |
| 2013/0144616 | A1* | 6/2013 | Bangalore | G10L 15/25 704/226 |
| 2017/0287490 | A1* | 10/2017 | Biswal | G10L 17/06 |
| 2018/0068671 | A1* | 3/2018 | Fawaz | G10L 25/78 |
| 2018/0137266 | A1* | 5/2018 | Kim | G06F 21/35 |
| 2018/0137678 | A1* | 5/2018 | Kaehler | G06F 3/013 |
| 2018/0293988 | A1* | 10/2018 | Huang | G10L 17/20 |
| 2018/0301151 | A1* | 10/2018 | Mont-Reynaud | G06F 3/167 |
| 2019/0012448 | A1* | 1/2019 | Lesso | H04W 12/06 |
| 2019/0155226 | A1* | 5/2019 | Trott | A61B 3/113 |
| 2019/0164552 | A1* | 5/2019 | Lim | G10L 15/28 |
| 2019/0166403 | A1* | 5/2019 | Yelton | G10L 15/22 |
| 2019/0197224 | A1* | 6/2019 | Smits | G06V 40/176 |
| 2019/0206228 | A1* | 7/2019 | Bhattacharya | G07C 9/25 |
| 2019/0295554 | A1* | 9/2019 | Lesso | G10L 17/04 |
| 2020/0051554 | A1* | 2/2020 | Kim | G06F 3/167 |
| 2020/0058300 | A1* | 2/2020 | Kumar | G10L 17/00 |
| 2020/0064921 | A1* | 2/2020 | Kang | G02B 27/01 |
| 2020/0098354 | A1* | 3/2020 | Lin | G10L 15/22 |
| 2020/0265843 | A1* | 8/2020 | Zhao | G10L 17/00 |
| 2020/0342855 | A1* | 10/2020 | Casado | G10L 15/00 |
| 2020/0410987 | A1* | 12/2020 | Tsunoo | G10L 15/22 |
| 2021/0027790 | A1* | 1/2021 | Choi | G06V 40/171 |
| 2021/0035552 | A1* | 2/2021 | Grizzel | G10L 15/22 |
| 2021/0065693 | A1* | 3/2021 | Sharifi | G10L 15/22 |
| 2022/0076676 | A1* | 3/2022 | Choi | G10L 15/30 |
| 2022/0084529 | A1* | 3/2022 | He | G06V 40/70 |

FOREIGN PATENT DOCUMENTS

| | | |
|---|---|---|
| CN | 106714023 A | 5/2017 |
| CN | 107665708 A | 2/2018 |
| CN | 108735218 A | 11/2018 |

* cited by examiner

METHOD AND APPARATUS FOR AWAKENING WEARABLE DEVICE

CROSS REFERENCE TO RELATED APPLICATIONS

The present application is a national phase entry under 35 USC § 371 of International Application PCT/CN2019/129114, filed on Dec. 27, 2019, which claims the benefit of and priority to Chinese Patent Application No. 201910007365.X, filed on Jan. 4, 2019, the entire disclosures of which are incorporated herein by reference.

FIELD

The present disclosure relates generally to the field of electronic devices, and more particularly to a method and apparatus for awakening a wearable device.

BACKGROUND

With the development of technology, wearable devices are gradually occupying an important position in people's lives. Considering issues such as power consumption and battery life, wearable devices are usually not always in a normal working state. When a user needs to use it, the wearable device may be awakened to a normal working state by certain means.

In the related art, approaches for waking up a wearable device (e.g., a waking-up word method) are not natural enough. When a waking-up word is used to wake up a wearable device, a specific waking-up word is said by a user, and the wearable device performs corresponding speech processing after listening to the waking-up word, to wake up the wearable device. The approaches for waking up a wearable device in the related art is too mechanical to achieve a natural and smooth experience. Therefore, there is an urgent need for a waking-up method capable of waking up a wearable device naturally.

SUMMARY

In view of the foregoing, a method and an apparatus for awakening a wearable device are provided by the present disclosure, with which a wearable device can be awakened during a normal interaction process between a wearer and the wearable device, thereby a natural wake-up process can be realized and user experience of the wearable device can be improved.

In view of the foregoing, a method and an apparatus for awakening a wearable device are provided by the present disclosure.

A method for waking up a wearable device is provided according to an aspect of the present disclosure, including: determining, based on a detected voice signal, whether the voice signal is from a wearer of the wearable device; determining, based on the voice signal, whether the voice signal belongs to the conversation between the wearer and the wearable device with a speech classification model, in which the speech classification model is trained by voice data samples including human-to-human conversations and human-machine interaction conversations and configured to perform classification prediction; and waking up the wearable device when the voice signal is from the wearer and the voice signal belongs to the conversation between the wearer and the wearable device.

A computing device is also provided according to another aspect of the present disclosure, including: at least one processor; and a memory configured to store executable instructions, which, when executed by the at least one processor, cause the at least one processor to perform a method for waking up a wearable device, including: determining, based on a detected voice signal, whether the voice signal is from a wearer of the wearable device; determining, based on the voice signal, whether the voice signal belongs to the conversation between the wearer and the wearable device with a speech classification model, in which the speech classification model is trained by voice data samples including human-to-human conversations and human-machine interaction conversations and configured to perform classification prediction; and waking up the wearable device when the voice signal is from the wearer and the voice signal belongs to the conversation between the wearer and the wearable device.

A non-transitory machine-readable store medium having stored therein executable instructions is also provided according to another aspect of the present disclosure, which, when executed, cause a machine to perform a method for waking up a wearable device, including: acquiring vocalization-related biometric information of a wearer of the wearable device; detecting a voice signal during a vocalization process of the wearer when the biometric information indicates that the wearer vocalizes; determining, based on the voice signal, whether the voice signal belongs to a conversation between the wearer and the wearable device with a speech classification model, wherein the speech classification model is trained by voice data samples including human-to-human conversations and human-machine interaction conversations and configured to perform classification prediction; and waking up the wearable device when the voice signal detected in the vocalization process of the wearer belongs to the conversation between the wearer and the wearable device.

BRIEF DESCRIPTION OF THE DRAWINGS

By referring to the following accompanying drawings, a further understanding of the nature and advantages of the present disclosure may be achieved. In the accompanying drawings, similar components or features may have the same reference label. The accompanying drawings are used to provide a further understanding of the embodiments of the present disclosure and constitute a part of the specification, and used to, together with the following detailed description, explain the embodiments of the present disclosure, but do not constitute a limitation to the embodiments of the present disclosure. In the accompanying drawings.

DETAILED DESCRIPTION

The subject described herein will be discussed below with reference to example embodiments. It should be understood that the discussion of these embodiments is only to enable those skilled in the art to better understand and implement the subject described herein, and is not to limit the scope, applicability or examples set forth in the claims. The functions and arrangements of the discussed elements may be changed without departing from the scope of the present disclosure. Various examples may omit, replace or add various processes or components as needed. In addition, features described with respect to some examples may also be combined in other examples.

As used herein, the term "including" and its variants represents open terms, meaning "including but not limited to." The term "based on" represents "based at least in part on." The terms "one embodiment" and "an embodiment" represent "at least one embodiment." The term "another embodiment" represents "at least one other embodiment." The terms "first", "second", etc. may refer to different or the same objects. Other definitions can be included below, either explicit or implicit. The definition of a term is consistent throughout the description, unless clearly indicated in the context.

A method and apparatus for awakening a wearable device of the present disclosure are described in conjunction with the accompanying drawings.

Figure 1:
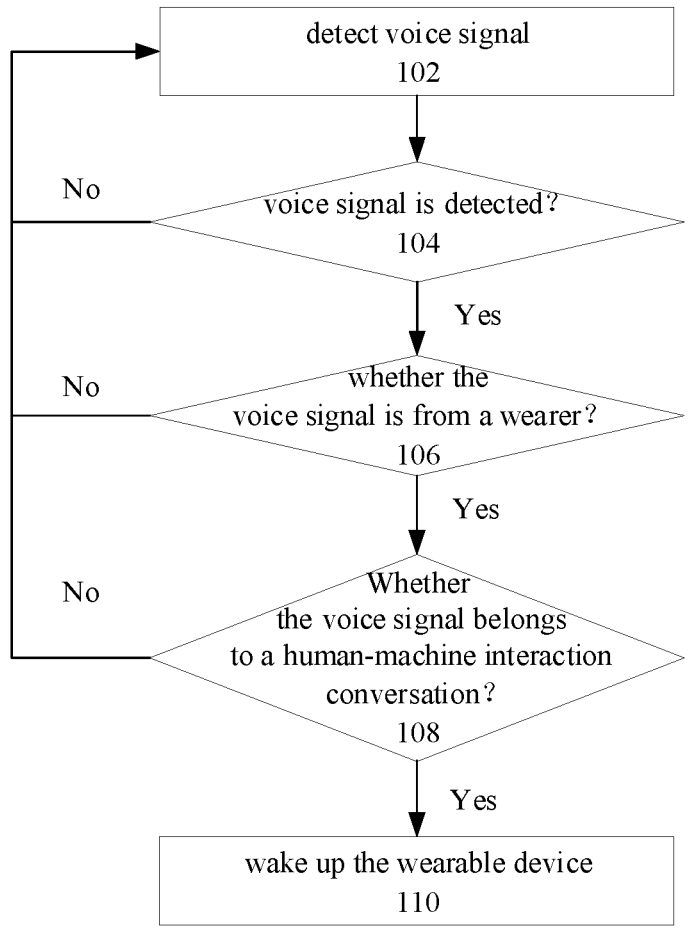
FIG. 1 is a flowchart of a method for waking up a wearable device according to an embodiment of the present disclosure.

FIG. 1 is a flowchart of a method for waking up a wearable device according to an embodiment of the present disclosure.

As shown in FIG. 1, at block 102, a voice signal is detected, and at block 104, it is determined whether a voice signal is detected. For methods of the present disclosure, processes from block 102 to block 104 are not a necessary element, and the process may also be a process performed independently of methods of the present disclosure.

When a voice signal is detected, at block 106, it is determined whether the voice signal is from the wearer of a wearable device based on the detected voice signal. The detected voice signal may be emitted by the wearer of the wearable device, or may be ambient noises in the environment where the wearable device is located or voices made by other people. In this embodiment, the wearable device is allowed to be awaken only in the event that the detected voice signal is from the wearer, which avoids that the wearable device is awakened by mistake.

In an example, when a voice signal is detected, voiceprint information in the voice signal may be recognized, and then it is determined whether the detected voice signal is from a wearer of a wearable device according to the voiceprint information and a voiceprint features of the wearer. For example, voice signal samples may be collected to train a voiceprint recognition model, and a wearer may record his/her own voice multiple times before the wearer uses the wearable device. After the voice of the wearer is recorded, the recorded voice is used to train the trained voiceprint recognition model again, performing feature extraction of the voice of the wearer. When the wearer uses a wearable device, the voiceprint recognition model may recognize whether the detected voice signal is from the wearer based on the extracted voiceprint features of the wearer. For example, the voiceprint recognition model may recognize the similarity between the detected voice signal and the wearer's voiceprint features, and when the similarity is not lower than a certain threshold, it is determined that the voice signal is from the wearer.

When it is determined that the detected voice signal comes from the wearer of the wearable device, at block 108, based on the detected voice signal, it is determined that whether the voice signal belongs to a conversation between the wearer and the wearable device with a speech classification model. It may be determined whether the detected voice signal belongs to a conversation between the wearer and the wearable device by determining whether the voice signal belongs to a human-machine interaction conversation.

When human-machine interaction is performed between a human and a machine, features such as the rhythm, loudness, tone, word, sentence pattern, and overtone intensity of speech are usually different from those of human-to-human conversation. Therefore, voice data samples including human-to-human conversations and human-machine interaction conversations may be collected, and then a speech classification model may be trained with these voice data samples. When a voice signal is detected, the voice signal may be input into a trained speech classification model for classification prediction. In an example, the speech classification model may output the probability that the detected voice signal belongs to a human-machine interaction conversation. At this point, when the probability output by the speech classification model is not lower than a predetermined probability threshold, it may be determined that the voice signal belongs to a conversation between the wearer and the wearable device.

At block 110, the wearable device is awakened in the event that the voice signal comes from the wearer and the voice signal belongs to the conversation between the wearer and the wearable device. Thus, when the wearer issues any voice command to the wearable device, the wearable device may be naturally awakened. The wearer does not need to perform a special wake-up operation when using the wearable device, which can bring a natural and smooth use experience to the wearer.

Figure 2:
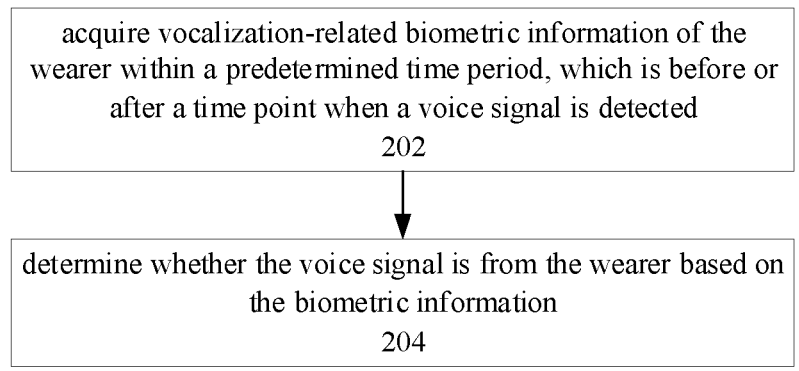
FIG. 2 is a flowchart of an example of a voice source determination process in a method for waking up a wearable device according to an embodiment of the present disclosure.

FIG. 2 is a flowchart of an example of a voice source determination process in a method for waking up a wearable device according to an embodiment of the present disclosure.

As shown in FIG. 2, at block 202, vocalization-related biometric information of a wearer within a predetermined time period, which is before or after a time point when a voice signal is detected, is acquired. In an example, biometric information within the predetermined time period, which is before or after the time point may be acquired, when the detected voice signal reaches a first threshold. For example, biometric information in the process of detecting voice signals may be acquired and stored in a database. When the detected voice signal reaches the first threshold, the biometric information within a predetermined time period, which is before a time point when the voice signal reaches the first threshold, is acquired. When the voice signal reaches the first threshold, the biometric information within a predetermined time period, which is after the time point when the voice signal reaches the first threshold, may also be acquired. Thus, the biometric information of the wearer in the process of detecting the voice signal can be acquired.

Then, at block 204, it is determined whether the voice signal is from the wearer based on the biometric information. When the wearer speaks, biological features of the wearer's face, throat, and other parts changes. Therefore, it may be recognized whether the wearer vocalizes during the process of detecting the voice signal based on the change of the vocalization-related biometric information. When the biometric information indicates that the wearer vocalizes during the detection of the voice signal, it may be determined that the voice signal is from the wearer.

The biometric information may include, e.g., a muscle electromyography signal, facial muscle movement information, and muscle vibration information, etc. Hereinafter, referring to FIGS. 3 to 6, examples of determining whether the wearer vocalizes based on the acquired biometric information and then determining the source of the voice are described.

Figure 3:
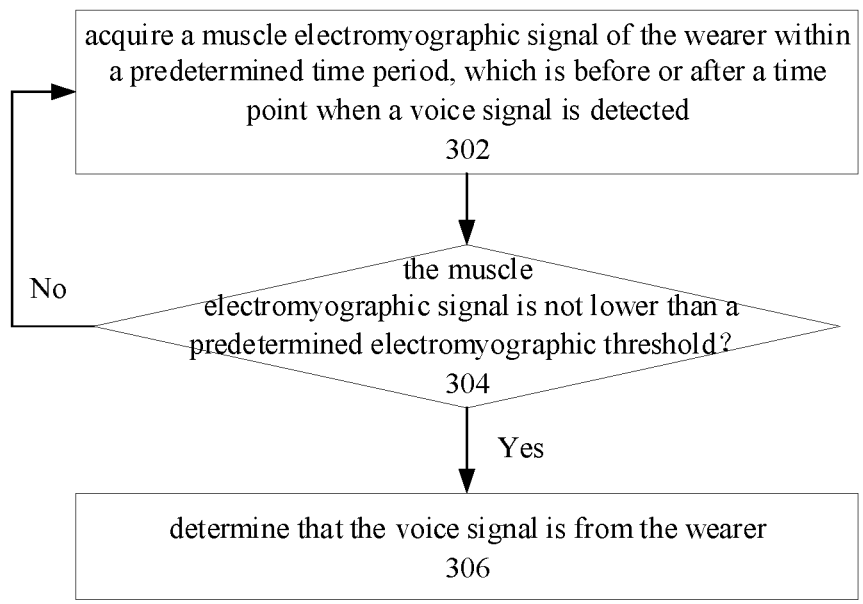
FIG. 3 is a flowchart of another example of a voice source determination process in a method for waking up a wearable device according to an embodiment of the present disclosure.

FIG. 3 is a flowchart of another example of a voice source determination process in a method for waking up a wearable device according to an embodiment of the present disclosure.

As shown in FIG. 3, at block 302, a vocalization-related muscle electromyographic signal of a wearer within a predetermined time period, which is before or after the time point when a voice signal is detected, is acquired. For example, the muscle electromyographic signal of the wearer's face, scalp, or neck may be detected with an electromyographic detection apparatus. The muscle electromyographic signal may be acquired with an electromyography (EMG) apparatus.

When the muscle electromyographic signal is acquired, at block 304, it is determined whether the acquired muscle electromyographic signal is not lower than a predetermined electromyographic threshold.

When the acquired muscle electromyographic signal is not lower than the electromyographic threshold, at block 306, it is determined that the voice signal is from the wearer. When the wearer vocalizes, these related muscle electromyographic signals have peak fluctuations. Therefore, when the acquired muscle electromyographic signal is not lower than the electromyographic threshold, it may be determined that the wearer is speaking when the voice signal is detected, at this point, it may be determined that the voice signal is from the wearer.

Figure 4:
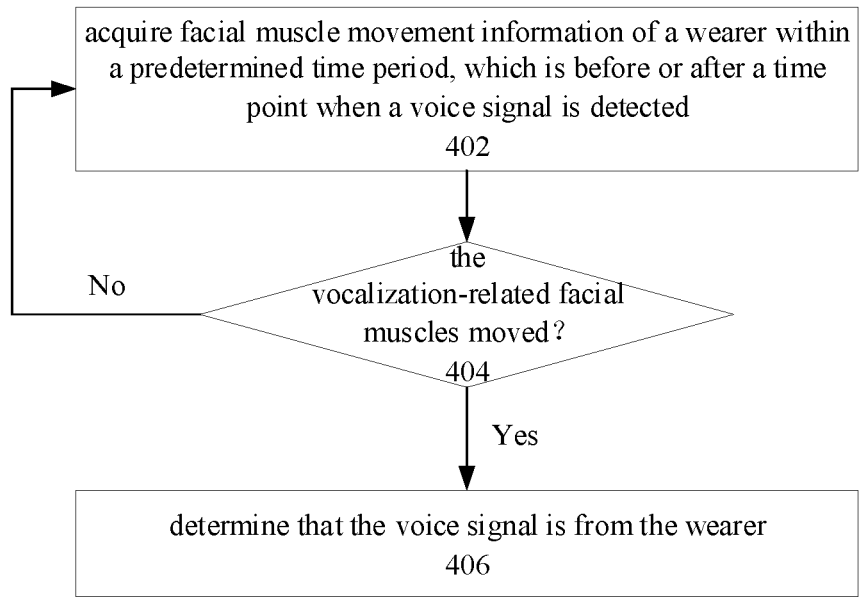
FIG. 4 is a flowchart of another example of a voice source determination process in a method for waking up a wearable device according to an embodiment of the present disclosure.

FIG. 4 is a flowchart of another example of a voice source determination process in a method for waking up a wearable device according to an embodiment of the present disclosure.

As shown in FIG. 4, at block 402, facial muscle movement information of a wearer within a predetermined time period, which is before or after the time point when a voice signal is detected, is acquired. The facial muscle movement information may be acquired with the examples shown in FIGS. 5 and 6.

Figure 5:
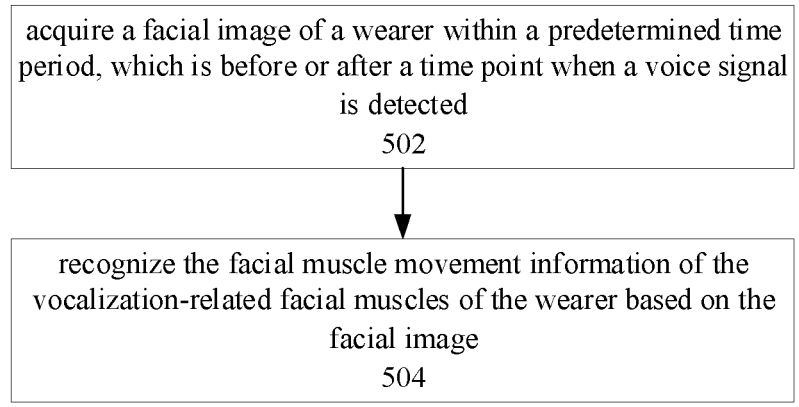
FIG. 5 and FIG. 6 are flowcharts of examples of a facial muscle movement information acquisition process in a method for waking up a wearable device according to an embodiment of the present disclosure.

In the example shown in FIG. 5, at block 502, a facial image of a wearer within a predetermined time period, which is before or after the time point when the voice signal is detected, is acquired. For example, a monocular RGB camera set in front of the forehead of the wearer may be used to acquire a facial image.

At block 504, the facial muscle movement information of vocalization-related facial muscles of the wearer is recognized based on a facial image. For example, it may be detected whether there is movement of the face and mouth in the facial image. In an example, some facial images showing that the person is speaking and other facial images showing that the person is not speaking may be used as training samples to train an image classification model, and then the trained image classification model is used to predict and classify acquired facial images, thus, by recognizing facial muscle information, it can be recognized whether the wearer has performed a speaking action.

Figure 6:
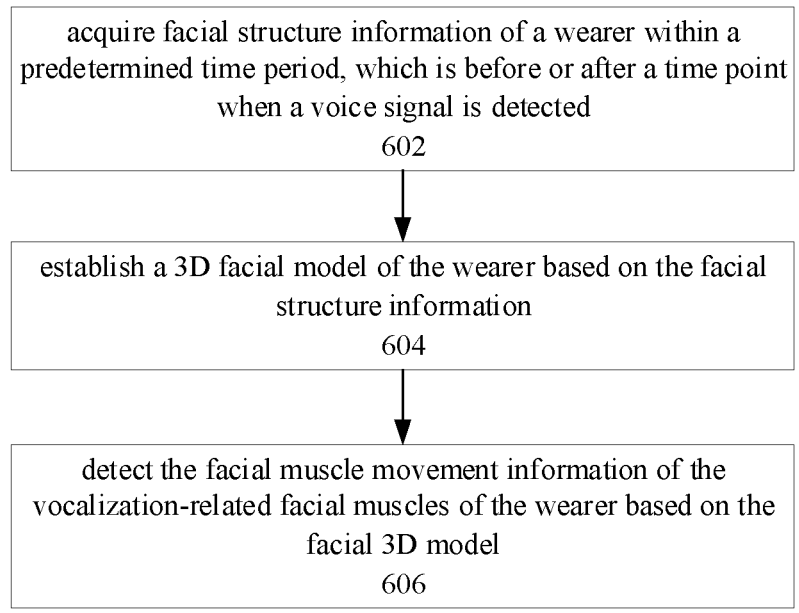

In the example shown in FIG. 6, at block 602, facial structure information of a wearer within a predetermined time period, which is before or after the time point when a voice signal is detected, is acquired. For example, the facial structure information may be facial ToF (time of flight) information, facial ultrasound scan information, facial structured light information, etc. A ToF 3D module, an ultrasonic sensor, a structured light scanning module, a binocular RGB camera and other apparatus set in front of the forehead of the wearer may be used to acquire facial structure information.

At block 604, a 3D facial model of the wearer is established based on the facial structure information.

After the 3D facial model is acquired, facial muscle movement information of the vocalization-related facial muscles of the wearer is detected based on the 3D facial model at block 606.

After the muscle movement information is acquired through the approach described above, at block 404, it is determined whether facial muscles of the wearer move based on the facial muscle movement information. For example, it may be detected whether mouth muscles of the wearer move based on the 3D facial model.

When facial muscles of the wearer move, it means that the wearer performs a speaking action when the voice signal is detected, therefore, at block 406, it is determined that the voice signal is from the wearer. For example, when the mouth or face of the wearer moves, it may be determined that the wearer performed a speaking action, and thus it may be determined that the wearer is speaking when the voice signal is detected, therefore it may be determined that the voice signal is from the wearer.

Figure 7:
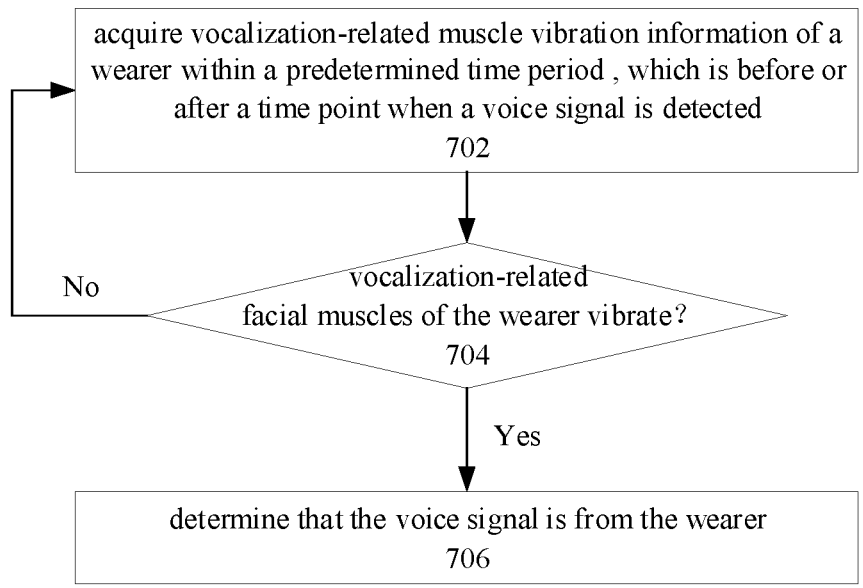
FIG. 7 is a flowchart of another example of a voice source determination process in a method for waking up a wearable device according to an embodiment of the present disclosure.

FIG. 7 is a flowchart of another example of a voice source determination process in a method for waking up a wearable device according to an embodiment of the present disclosure.

As shown in FIG. 7, at block 702, vocalization-related muscle vibration information of a wearer within a predetermined time period, which is before or after a time point when a voice signal is detected, is acquired. Muscle vibration information may be detected with a motion sensor (e.g., an inertial measurement unit (IMU)) attached to vocalization-related muscles.

Then at block 704, it is determined whether the wearer's vocalization-related facial muscles vibrate based on the muscle vibration information.

When it is determined that the facial muscles vibrate, at block 706, it is determined that the voice signal is from the wearer of the wearable device. When the wearer speaks, the facial muscles vibrate. Therefore, when the facial muscles vibrate, it may be determined that a speaking action occurs on the wearer's face, and based on this, it is determined that the voice signal is from the wearable device.

Figure 8:
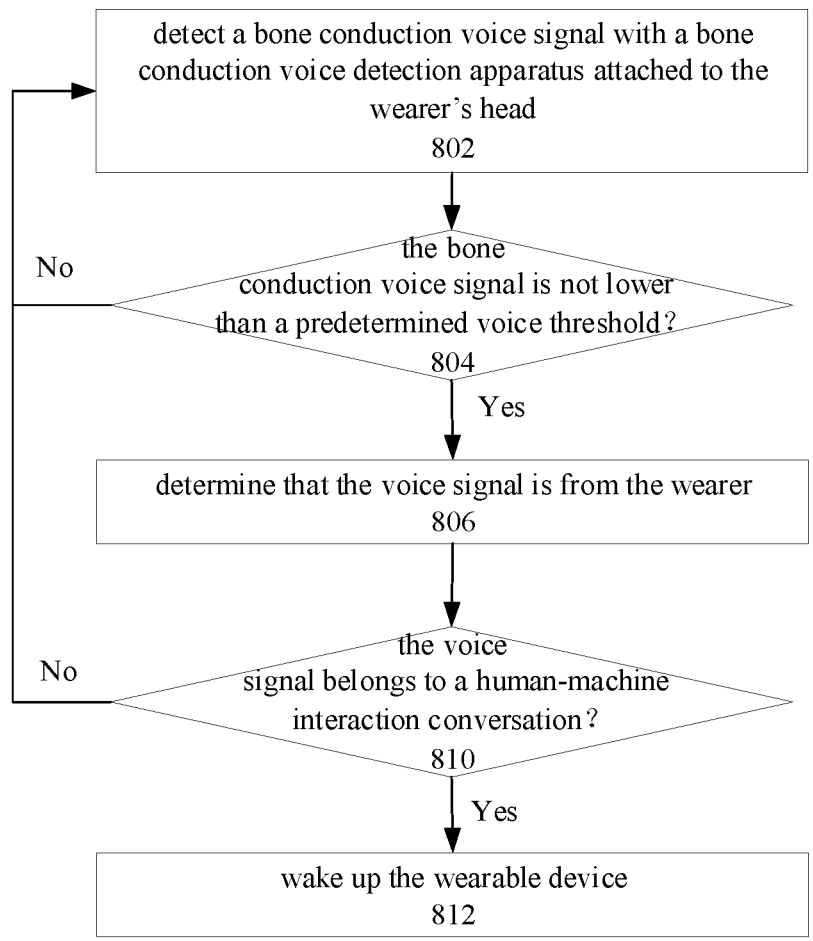
FIG. 8 is a flowchart of a method for waking up a wearable device according to another embodiment of the present disclosure.

FIG. 8 is a flowchart of a method for waking up a wearable device according to another embodiment of the present disclosure.

As shown in FIG. 8, at block 802, a bone conduction voice signal is detected with a bone conduction voice detection apparatus attached to a wearer's head or neck. The bone conduction voice detection apparatus may be, e.g., a bone conduction microphone. The bone conduction microphone may be attached to any position of the head or neck to detect bone conduction voice.

Then at block 804, it is determined whether the bone conduction voice signal is not lower than a predetermined voice threshold.

When the bone conduction voice signal is not lower than a predetermined voice threshold, at block 806, it is determined that the voice signal is from the wearer. When a person vocalizes, the voice can be conducted through bones of the head or neck. When the voice signal is detected by the bone conduction voice detection device, the bone conduction voice signal from the wearer himself/herself is stronger than a voice signal from the environment other than the wearer. Therefore, it may be determined that the detected voice signal is from the wearer when the bone conduction voice signal is not lower than the predetermined voice threshold. The predetermined voice threshold may be acquired through experiments to verify the value, and also be adjusted by the wearer.

When it is determined that the voice signal is from the wearer, it may be determined at block 810 whether the voice signal belongs to a human-machine interaction conversation. When the voice signal comes from the wearer and belongs to a human-machine interaction conversation, at block 812, the wearable device is awakened.

Figure 9:
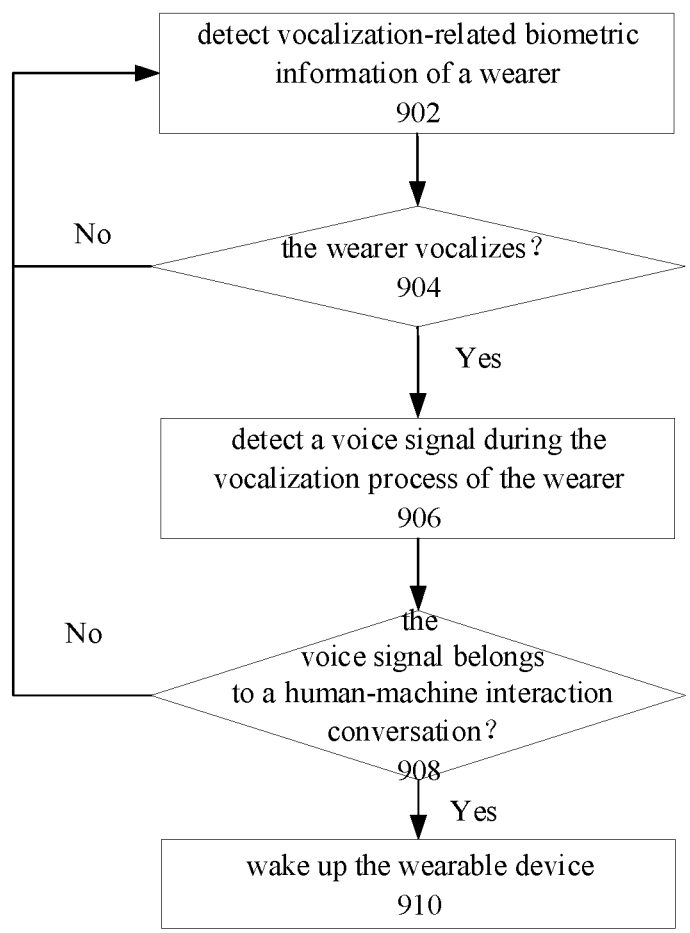
FIG. 9 is a flowchart of a method for waking up a wearable device according to another embodiment of the present disclosure.

FIG. 9 is a flowchart of a method for waking up a wearable device according to another embodiment of the present disclosure.

As shown in FIG. 9, at block 902, vocalization-related biometric information of a wearer of a wearable device is acquired. The biometric information may be any one or more of the vocalization-related muscle electromyography signal, facial muscle movement information, bone conduction voice signals, etc. described above.

At block 904, it is determined whether the wearer vocalizes according to the biometric information. The process of determining whether the wearer vocalizes may be performed, e.g., as vocalization determination processes described with reference to FIGS. 3 to 8 above. For example, a bone conduction voice signal may be detected with a bone conduction microphone attached to a wearer's head or neck, and when the bone conduction voice signal reaches a predetermined voice threshold, it is determined that the wearer is vocalizing.

When the biometric information indicates that the wearer vocalizes, at block 906, a voice signal in a vocalization process of the wearer is detected. For example, a muscle electromyographic signal of the wearer's facial muscles may be detected with a muscle electromyographic detection apparatus. When the muscle electromyographic signal is not lower than a predetermined electromyographic threshold, it is determined that the wearer vocalizes, and voice signal detection may begin when the muscle electromyographic signal reaches the predetermined electromyographic threshold. In another example, a motion sensor (e.g., an inertial measurement unit (IMU)) attached to vocalization-related muscles may be used to detect whether the vocalization-related muscles vibrate, and when vibration occurs, it may be determined that the wearer vocalizes at this time, and voice signal detection may begin at this point. In an example, the facial muscle movement information of the wearer may also be acquired by the methods described above with reference to FIGS. 4-6, and when the facial muscle movement information indicates that the wearer vocalizes, the voice signal detection begins.

Then, at block 908, based on the voice signal, it is determined that whether the voice signal belongs to the conversation between the wearer and the wearable device with a speech classification model. A speech classification model can be trained with voice data samples including human-to-human conversation and human-machine interaction conversation, and detected voice signals can be classified with this speech classification model.

At block 910, the wearable device is awakened when the voice signal detected in the vocalization process of the wearer belongs to a conversation between the wearer and the wearable device.

Figure 10:
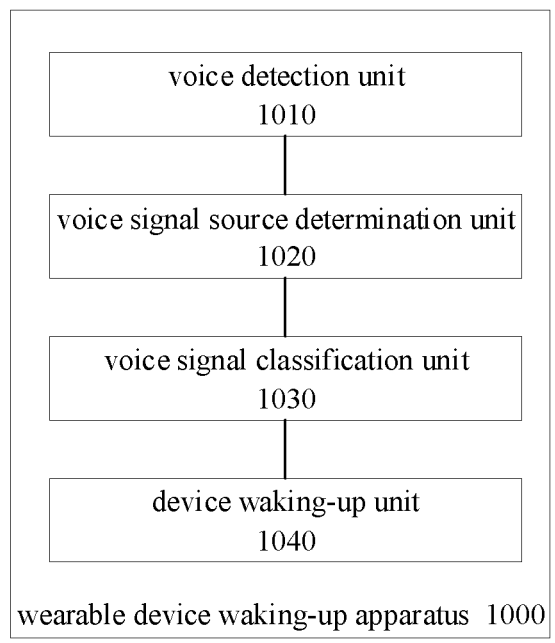
FIG. 10 is a structural block diagram of an apparatus for waking up a wearable device according to an embodiment of the present disclosure.

FIG. 10 is a structural block diagram of an apparatus 1000 (hereinafter referred to as wearable device waking-up apparatus) for waking up a wearable device according to an embodiment of the present disclosure. As shown in FIG. 10, the wearable device waking-up apparatus 1000 includes a voice detection unit 1010, a voice source determination unit 1020, a voice signal classification unit 1030, and a device waking-up unit 1040.

The voice detection unit 1010 is configured to detect a voice signal. The voice source determination unit 1020 is configured to determine, based on a detected voice signal, whether the voice signal is from a wearer of a wearable device. The voice signal classification unit 1030 is configured to determine, based on the detected voice signal, whether the voice signal belongs to the conversation between the wearer and the wearable device with a speech classification model. The device waking-up unit 1040 is configured to wake up the wearable device when the voice signal comes from the wearer and the voice signal belongs to a conversation between the wearer and the wearable device.

It should be noted that although the voice detection unit is shown in FIG. 10, it should be understood that the wearable device waking-up apparatus of the present disclosure may not include the voice detection unit. The voice detection unit may also be an element independent of the wearable device waking-up apparatus.

In an example, the voice signal may be a bone conduction voice signal, and the voice detection unit 1010 may be a bone conduction voice detection unit. The bone conduction voice detection unit is configured to be able to attached to a wearer's head or neck to detect a bone conduction voice signal when the wearer wears a wearable device. For example, when the wearable device waking-up apparatus is applied to a wearable device, the bone conduction voice detection apparatus may be a bone conduction microphone that can be worn on the wearer's ear, and a voice signal detected by the bone conduction voice detection apparatus may be sent to the voice source determination unit and the voice signal classification unit in a wired or wireless manner. In another example, the bone conduction voice detection apparatus may be designed to be hung on a wearable device, and may be attached to any position near a wearer's head bone or neck bone when the wearer uses the wearable device. In this example, the signal source determination module may determine the voice signal is a voice signal from a wearer of a wearable device when the bone conduction voice signal is not lower than a predetermined voice threshold.

Figure 11:
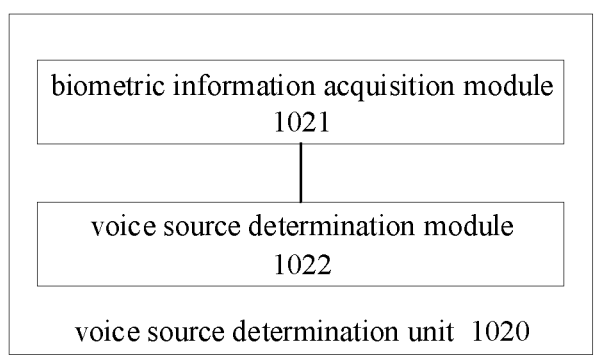
FIG. 11 is a structural block diagram of an example of a voice source determination unit in the apparatus for waking up a wearable device shown in FIG. 10.

FIG. 11 is a structural block of an example of a voice source determination unit 1020 in a wearable device waking-up apparatus 1000 according to an embodiment of the present disclosure. As shown in FIG. 11, the voice source determination unit 1020 includes a biometric information acquisition module 1021 and a voice signal source determination module 1022.

The biometric information acquisition module 1021 is configured to acquire vocalization-related biometric information of a wearer within a predetermined time period, which is before or after the time point when a voice signal is detected. The biometric information acquisition module 1021 can also be configured to acquire the vocalization-related biometric information of a wearer within a predetermined time period, which is before or after the time point when a voice signal is detected and the voice signal reaches a first threshold. The biometric information may be a vocalization-related muscle electromyographic signal, facial structure information, facial muscle movement information, and muscle vibration information, etc.

After acquiring a biometric information of a wearer, the voice signal source determination module 1022 can determine whether the voice signal is from the wearer based on the biometric information. In an example, the biometric information may include vocalization-related muscle vibration information of the wearer. In this example, the biometric information acquisition module 1021 can include a muscle vibration information acquisition sub-module to detect vocalization-related muscle vibration information. At this point, the voice signal source determination module 1022 can be configured to determine that a voice signal is from a wearer when the vocalization-related muscle vibration information indicates that vocalization-related muscles of the wearer vibrate.

In an example, the biometric information acquisition module 1021 may include a muscle electromyographic detection sub-module. The muscle electromyographic detection sub-module is configured to acquire a muscle electromyographic signal of a wearer within a predetermined time period, which is before or after the time point when a voice signal is detected. In this example, the voice signal source determination module is configured to determine that a voice signal is from a wearer when an acquired muscle electromyographic signal is not lower than a predetermined electromyographic threshold.

In an example, a biometric information includes facial muscle movement information of a wearer. In this example, the voice signal source determination module can be configured to determine that a voice signal is from a wearer when the facial muscle movement information of the wearer indicates that the vocalization-related facial muscles of the wearer move. The muscle movement information may be detected based on a facial image or a 3D facial model.

Figure 12:
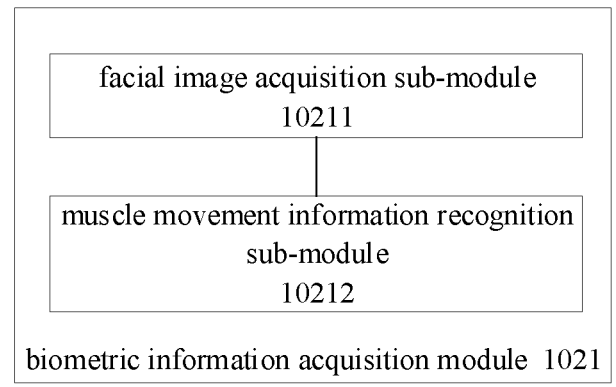
FIG. 12 and FIG. 13 are structural block diagrams of examples of a biometric information acquisition module in the apparatus for waking up a wearable device in FIG. 10.
Figure 13:
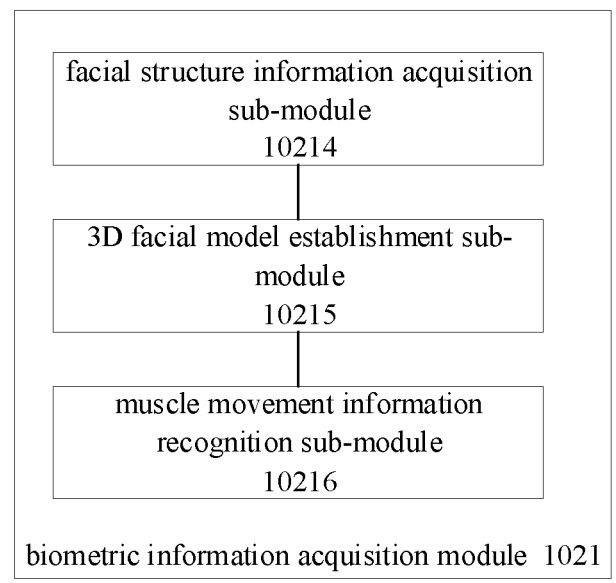

FIG. 12 and FIG. 13 are structural block diagrams of examples of a biometric information acquisition module in the wearable device waking-up apparatus 1000 in FIG. 11.

As shown in 12, the biometric information acquisition module 1021 can include a facial image acquisition sub-module 10211 and a muscle movement information recognition sub-module 10212. The facial image acquisition sub-module 10211 is configured to acquire facial image of a wearer within a predetermined time period, which is before or after the time point when a voice signal is detected. The muscle movement information recognition sub-module 10212 is configured to recognize facial muscle movement information of vocalization-related facial muscles of the wearer based on a facial image.

As shown in FIG. 13, the biometric information acquisition module can include a facial structure information acquisition sub-module 10214, a 3D facial model establishment sub-module 10215, and a muscle movement information recognition sub-module 10216. The facial structure information acquisition sub-module 10213 is configured to acquire facial structure information of a wearer within a predetermined time period, which is before or after the time point when a voice signal is detected. Then, the 3D facial model establishment sub-module 10214 establishes the 3D facial model of the wearer based on the facial structure information. After the 3D facial model is established, the muscle movement information recognition sub-module 10216 may detect facial muscle movement information of the facial muscles of the wearer related to vocalization based on the 3D facial model.

Figure 14:
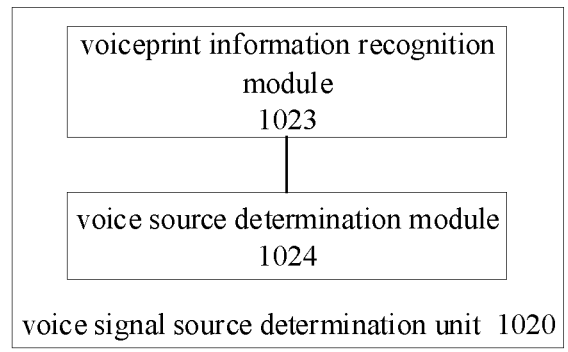
FIG. 14 is a structural block diagram of another example of a voice source determination unit in the apparatus for waking up a wearable device shown in FIG. 10.

FIG. 14 is a structural block of another example of a voice source determination unit 1020 in the wearable device waking-up apparatus 1000 shown in FIG. 10. As shown in FIG. 13, the voice source determination unit can include a voiceprint information recognition module 1023 and a voice source determination module 1024. The voiceprint information recognition module 1023 is configured to recognize voiceprint information of a detected voice signal. The voice source determination module 1024 is configured to determine whether a voice signal is from a wearer based on voiceprint features of the wearer and recognized voiceprint information.

Figure 15:
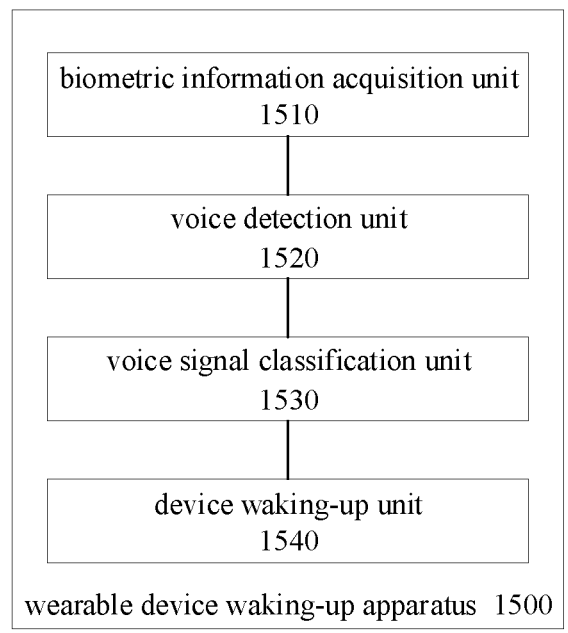
FIG. 15 is a structural block diagram of an apparatus for waking up a wearable device according to another embodiment of the present disclosure.

FIG. 15 is a structural block diagram of wearable device waking-up apparatus 1500 according to another embodiment of the present disclosure. As shown in FIG. 15, the wearable device waking-up apparatus 1500 includes a biometric information acquisition unit 1510, a voice detection unit 1520, a voice signal classification unit 1530, and a device waking-up unit 1540.

The biometric information acquisition unit 1510 is configured to acquire vocalization-related biometric information of a wearer of a wearable device. When a biometric information indicates that a wearer action is performing a vocalizing action, the voice detection unit 1520 detects a voice signal during the vocalizing action of the wearer. The voice signal classification unit 1530 is configured to determine whether a voice signal belongs to a conversation between the wearer and the wearable device with a speech classification model based on the voice signal. When the voice signal detected in a vocalization process of the wearer belongs to the conversation between the wearer and the wearable device, the device waking-up unit 1540 wakes up the wearable device.

In an example, the biometric information acquisition unit 1510 can include at least one of a muscle electromyographic detection module, a muscle movement detection module, and a bone conduction voice detection module. The muscle electromyographic detection module is configured to detect a muscle electromyographic signal of a wearer. The muscle movement detection module is configured to detect a facial muscle movement information of a wearer. The bone conduction voice detection module is configured to detect a bone conduction voice signal of a wearer.

The method and apparatus for waking up a wearable device of the present disclosure are described above with reference to FIGS. 1-15. It should be noted that the foregoing detailed description of embodiments of the method is also applicable to embodiments of the apparatus. The apparatus for recognizing application program controls displayed on a terminal device of the present disclosure may be implemented by hardware, by software or, by a combination of hardware and software. In the present disclosure, the apparatus for recognizing application program controls displayed on the terminal device may be implemented with e.g., a computing device.

Figure 16:
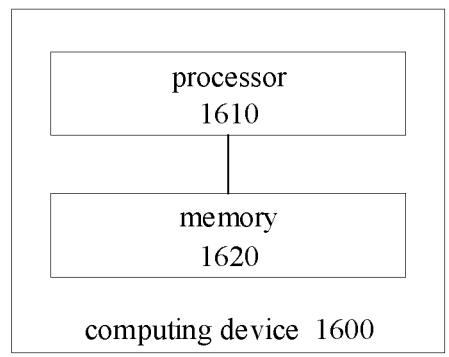
FIG. 16 is a structural block diagram of a computing device for implementing a method for waking up a wearable device according to an embodiment of the present disclosure.

FIG. 16 is a structural block diagram of a computing device 1600 for implementing a method for waking up a wearable device according to an embodiment of the present disclosure. According to an embodiment, the computing device 1600 may include at least one processor 1610 that executes at least one computer-readable instruction (i.e., elements implemented in software described above) stored or encoded in a computer-readable storage medium (i.e., the memory 1620).

In an embodiment, computer-executable instructions are stored in the memory 1620, which, when executed cause the at least one processor 1610 to determine, based on a detected voice signal, whether a voice signal is from a wearer wearable device; determine, based on the voice signal, whether the voice signal belongs to a conversation between the wearer and the wearable device with a speech classification model; and wake up the wearable device when the voice signal comes from the wearer and the voice signal belongs to the conversation between the wearer and the wearable device.

It should be understood that the computer-executable instructions stored in the memory 1620, when executed, cause the at least one processor 1610 to perform various operations and functions described above in conjunction with FIGS. 1-8 and 10-14 in the various embodiments of the present disclosure.

Figure 17:
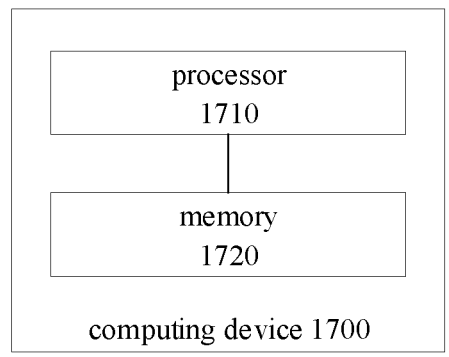
FIG. 17 is a structural block diagram of a computing device for implementing a method for waking up a wearable device according to an embodiment of the present disclosure.

FIG. 17 is a structural block diagram of a computing device 1700 for implementing a method for waking up a wearable device according to an embodiment of the present disclosure. According to an embodiment, the computing device 1700 may include at least one processor 1710 that executes at least one computer-readable instruction (i.e., the elements implemented in software described above) stored or encoded in a computer-readable storage medium (i.e., the memory 1720).

In an embodiment, computer-executable instructions are stored in the memory 1720, which, when executed cause the at least one processor 1710 to acquire vocalization-related biometric information of a wearer of the wearable device; detect a voice signal during the vocalization process of the wearer when the biometric information indicates that the wearer vocalizes; determine, based on the voice signal, whether the voice signal belongs to the conversation between the wearer and the wearable device with a speech classification model; and wake up the wearable device when the voice signal detected in the vocalization process of the wearer belongs to the conversation between the wearer and the wearable device.

It should be understood that the computer-executable instructions stored in the memory 1720, when executed, cause the at least one processor 1710 to perform various operations and functions described above in conjunction with FIGS. 9 and 15 in the various embodiments of the present disclosure.

According to an embodiment, a program product such as a non-transitory machine-readable medium is provided. The non-transitory machine-readable medium may have instructions (i.e., the elements implemented in the form of software described above), which, when executed by a machine, cause the machine to execute various operations and functions described above in conjunction with FIGS. 1-8 and 10-14 in the various embodiments of the present disclosure. In an example, the non-transitory machine-readable medium may have instructions (i.e., the elements implemented in the form of software described above), which, when executed by a machine, cause the machine to execute various operations and functions described above in conjunction with FIGS. 9 and 15 in the various embodiments of the present disclosure.

Specifically, a system or an apparatus equipped with a readable storage medium may be provided, and the software program code for implementing the function of any one of the embodiments described above is stored on the readable storage medium, and the computer or processor of the system or apparatus is caused to read out and execute the instructions stored in the readable storage medium.

In this case, the program code itself read from the readable medium may realize the function of any one of the embodiments described above, so the machine readable code and the readable storage medium storing the machine readable code constitute a part of the present disclosure.

Embodiments of readable storage media include floppy disk, hard disk, magneto-optical disk, optical disk (such as CD-ROM, CD-R, CD-RW, DVD-ROM, DVD-RAM, DVD-RW, DVD-RW), magnetic tape, non-volatile memory card and ROM. Alternatively, the program code may be downloaded from a server computer or cloud via a communication network.

It should be noted that not all steps and units in the processes and system structure diagrams described above are necessary, and some steps or units may be omitted according to actual needs. The performance order of each step is not fixed, and may be determined as needed. The apparatus structure described in the foregoing embodiments may be a physical structure or a logical structure, that is, some units may be implemented by a same physical entity, or some units may be implemented by multiple physical entities separately, or may be jointly implemented by some parts in multiple independent devices.

A method for waking up a wearable device is provided according to an aspect of the present disclosure, including: determining, based on a detected voice signal, whether the voice signal is from a wearer of the wearable device; determining, based on the voice signal, whether the voice signal belongs to the conversation between the wearer and the wearable device with a speech classification model; and waking up the wearable device when the voice signal is from the wearer and the voice signal belongs to the conversation between the wearer and the wearable device.

Optionally, in an example, determining, based on a detected voice signal, whether the voice signal is from a wearer of the wearable device may include: acquiring vocalization-related biometric information of the wearer within a predetermined time period, which is before or after a time point when the voice signal is detected; and determining whether the voice signal is from the wearer based on the biometric information.

Optionally, in an example, acquiring vocalization-related biometric information of the wearer within a predetermined time period, which is before or after a time point when the voice signal is detected may include: acquiring vocalization-related biometric information of the wearer within a predetermined time period, which is before or after a time point when the voice signal is detected, and the voice signal reaches a first threshold.

Optionally, in an example, the biometric information may include a muscle electromyographic signal of the wearer, and determining whether the voice signal is from the wearer based on the biometric information may include: determining that the voice signal is from the wearer when the acquired muscle electromyographic signal is not lower than a predetermined electromyographic threshold.

Optionally, in an example, the biometric information may include facial muscle movement information of the wearer, determining whether the voice signal is from the wearer based on the biometric information includes: determine that the voice signal is from the wearer when the facial muscle movement information of the wearer indicates that vocalization-related facial muscles of the wearer move.

Optionally, in an example, acquiring vocalization-related biometric information of the wearer within a predetermined time period, which is before or after a time point when the voice signal is detected may include: acquiring a facial image of the wearer within a predetermined time period, which is before or after a time point when the voice signal is detected; and recognizing the facial muscle movement information of the vocalization-related facial muscles of the wearer based on the facial image.

Optionally, in an example, acquiring biometric information of the wearer within a predetermined time period, which is before or after a time point when the voice signal is detected may include: acquiring facial structure information of the wearer within a predetermined time period, which is before or after a time point when the voice signal is detected; establishing a 3D facial model of the wearer based on the facial structure information; and detecting the facial muscle movement information of the vocalization-related facial muscles of the wearer based on the 3D facial model.

Optionally, in an example, the biometric information includes vocalization-related muscle vibration information of the wearer, and determining whether the voice signal is from the wearer based on the biometric information may include: determining that the voice signal is from the wearer when the vocalization-related muscle vibration information indicates that vocalization-related muscles of the wearer vibrate.

Optionally, in an example, determining, based on a detected voice signal, whether the voice signal is from a wearer of the wearable device may include: recognizing voiceprint information of the detected voice signal; and determining whether the voice signal is from the wearer based on voiceprint features of the wearer and recognized voiceprint information.

Optionally, in an example, the voice signal may be a bone conduction voice signal, and the bone conduction voice signal is detected with a bone conduction voice detection apparatus attached to the wearer's head or neck, and determining, based on a detected voice signal, whether the voice signal is from the wearer of the wearable device may include: determining that the voice signal is a voice signal from a wearer of a wearable device when the bone conduction voice signal is not lower than a predetermined voice threshold.

According to another aspect of the present disclosure, a method for waking up a wearable device is also provided, including: acquiring vocalization-related biometric information of a wearer of the wearable device; detecting a voice signal during a vocalization process of the wearer when the biometric information indicates that the wearer vocalizes; determining, based on the voice signal, whether the voice signal belongs to a conversation between the wearer and the wearable device with a speech classification model; and waking up the wearable device when the voice signal detected in the vocalization process of the wearer belongs to the conversation between the wearer and the wearable device.

Optionally, in an example, the biometric information may include at least one of: a muscle electromyographic signal of the wearer; facial muscle movement information of the wearer; and a bone conduction voice signal of the wearer.

According to another aspect of the present disclosure, an apparatus for waking up a wearable device is also provided, including: a voice source determination unit configured to determine, based on a detected voice signal, whether the voice signal is from a wearer of the wearable device; a voice signal classification unit configured to determine, based on the voice signal, whether the voice signal belongs to a conversation between the wearer and the wearable device with a speech classification model; and a device waking-up unit configured to wake up the wearable device when the voice signal is from the wearer and the voice signal belongs to the conversation between the wearer and the wearable device.

Optionally, in an example, the voice source determination unit may include: a biometric information acquisition module configured to acquire vocalization-related biometric information of the wearer within a predetermined time period, which is before or after a time point when the voice signal is detected; and a voice signal source determination module configured to determine whether the voice signal is from the wearer based on the biometric information.

Optionally, in an example, the biometric information acquisition module may be configured to acquire vocalization-related biometric information of the wearer within a predetermined time period, which is before or after a time point when the voice signal is detected and the voice signal reaches a first threshold.

Optionally, in an example, a biometric information acquisition module may include: a muscle electromyographic detection sub-module configured to acquire a muscle electromyographic signal of the wearer within a predetermined time period, which is before or after a time point when the voice signal is detected, the voice signal source determination module is configured to: determine that the voice signal is from the wearer when the acquired muscle electromyographic signal is not lower than a predetermined electromyographic threshold.

Optionally, in an example, the biometric information includes facial muscle movement information of the wearer, and the voice signal source determination module may be configured to: determine that the voice signal is from the wearer when the facial muscle movement information of the wearer indicates that vocalization-related facial muscles of the wearer move.

Optionally, in an example, the biometric information acquisition module may include: a facial image acquisition sub-module configured to acquire a facial image of the wearer within a predetermined time period, which is before or after a time point when the voice signal is detected; and a muscle movement information recognition sub-module configured to recognize the facial muscle movement information of the vocalization-related facial muscles of the wearer based on the facial image.

Optionally, in an example, the biometric information acquisition module may include: a facial structure information acquisition sub-module configured to acquire facial structure information of the wearer within a predetermined time period, which is before or after a time point when the voice signal is detected; a 3D facial model establishment sub-module configured to establish a 3D facial model of the wearer based on the facial structure information; and a muscle movement information recognition sub-module configured to recognize facial muscle movement information of the vocalization-related facial muscles of the wearer based on the 3D facial model.

Optionally, in an example, the biometric information includes vocalization-related muscle vibration information of the wearer, and the voice signal source determination module may be configured to: determine that the voice signal is from the wearer when the vocalization-related muscle vibration information indicates that vocalization-related muscles of the wearer vibrate.

Optionally, in an example, the voice source determination unit may include: a voiceprint information recognition module configured to recognize voiceprint information of the detected voice signal; and a voice signal source determination module configured to determine whether the voice signal is from the wearer based on voiceprint features of the wearer and recognized voiceprint information.

Optionally, in an example, the apparatus further includes: a voice detection unit configured to detect a voice signal.

Optionally, in an example, the voice signal may be a bone conduction voice signal, the voice detection unit may include a bone conduction voice detection unit, configured to be able to attached to a wearer's head or neck to detect a bone conduction voice signal when the wearer wears the wearable device; and a voice signal source determination module configured to determine that the voice signal is a voice signal from a wearer of a wearable device when the bone conduction voice signal is not lower than a predetermined voice threshold.

An apparatus for waking up a wearable device is also provided according to another aspect of the present disclosure, including: a biometric information acquisition unit configured to acquire vocalization-related biometric information of a wearer of the wearable device; a voice detection unit configured to detect a voice signal during a vocalization process of the wearer when the biometric information indicates that the wearer vocalizes; a voice signal classification unit configured to determine, based on the voice signal, whether the voice signal belongs to a conversation between the wearer and the wearable device with a speech classification model; and a device waking-up unit, configured to wake up the wearable device when the voice signal detected in the vocalization process of the wearer belongs to the conversation between the wearer and the wearable device.

Optionally, in an example, the biometric information acquisition module may include at least one of: a muscle electromyographic detection module configured to detect a muscle electromyographic signal of the wearer; a muscle movement detection module configured to detect facial muscle movement information of the wearer; and a bone conduction voice detection module configured to detect a bone conduction voice signal of the wearer.

A computing device is also provided according to another aspect of the present disclosure, including: at least one processor; and a memory configured to store executable instructions, which, when executed by the at least one processor, cause the at least one processor to perform the method of the claims described above.

A non-transitory machine-readable store medium having stored therein executable instructions is also provided according to another aspect of the present disclosure, which, when executed, cause a machine to perform the method described above.

Exemplary embodiments are described above by the detailed description set forth in conjunction with the accompanying drawings, but do not represent all embodiments that can be implemented or fall within the protection scope of the claims. The term "exemplary" used throughout the description means "serving as an example, instance, or illustration", and not "preferred" or "advantageous" over other embodiments. The detailed description includes specific details for the purpose of providing an understanding of the described techniques. These techniques, however, may be practiced without these specific details. In some instances, well-known structures and apparatuses are shown in block diagram form in order to avoid obscuring the concepts of the described embodiments.

The optional implementations of the embodiments of the present disclosure are described above in detail in conjunction with the accompanying drawings, however, the embodiments of the present disclosure are not limited to the specific details in the foregoing embodiments, within the scope of the technical concept of the embodiments of the present disclosure, a variety of simple variations may be made to the technical solutions of the embodiments of the present disclosure, which all fall into the scope of the embodiments of the present disclosure.

The foregoing description of the present disclosure is provided to enable a person skilled in the art to implement or use the present disclosure. Various modifications to the present disclosure will be readily apparent to those skilled in the art, and the generic principles defined herein may be applied to other variations without departing from the scope of the present disclosure. Thus, the present disclosure is not limited to the examples and designs described herein, but is to be accorded the broadest scope consistent with the principles and novel features disclosed herein.

What is claimed is:

1. A method for waking up a wearable device, comprising:
determining, based on a detected voice signal, whether the voice signal is from a wearer of the wearable device;
determining, based on the voice signal, whether the voice signal belongs to a conversation between the wearer and the wearable device with a speech classification model, wherein the speech classification model is trained by voice data samples comprising human-to-human conversations and human-machine interaction conversations and configured to output probability that the detected voice signal belongs to the human-machine interaction conversations, and in response to that the probability output by the speech classification model is not lower than a predetermined probability threshold, it is determined that the voice signal belongs to the conversation between the wearer and the wearable device, wherein the voice data samples do not comprise a waking-up word for waking up the wearable device; and waking up the wearable device when the voice signal is from the wearer and the voice signal belongs to the conversation between the wearer and the wearable device, wherein determining, based on a detected voice signal, whether the voice signal is from a wearer of the wearable device comprises:

acquiring vocalization-related biometric information of the wearer within a predetermined time period, which is before a time point when the voice signal is detected; and determining whether the voice signal is from the wearer based on the biometric information.

2. The method of claim 1, wherein acquiring vocalization-related biometric information of the wearer within the predetermined time period, which is before the time point when the voice signal is detected comprises:

acquiring vocalization-related biometric information of the wearer within a predetermined time period, which is before the time point when the voice signal is detected, and the voice signal reaches a first threshold.

3. The method of claim 1, wherein the biometric information comprises a muscle electromyographic signal of the wearer, and determining whether the voice signal is from the wearer based on the biometric information comprises:

determining that the voice signal is from the wearer when the acquired muscle electromyographic signal is not lower than a predetermined electromyographic threshold.

4. The method of claim 1, wherein acquiring vocalization-related biometric information of the wearer within the predetermined time period, which is before the time point when the voice signal is detected comprises:

acquiring a facial image of the wearer within the predetermined time period, which is before the time point when the voice signal is detected; and recognizing facial muscle movement information of vocalization-related facial muscles of the wearer based on the facial image.

5. The method of claim 4, wherein before recognizing the facial muscle movement information of the vocalization-related facial muscles of the wearer based on the facial image, the method further comprises:

predicting and classifying the acquired facial image with an image classification model, wherein the image classification model is trained by first facial images showing that the person is speaking and second facial images showing that the person is not speaking.

6. The method of claim 1, wherein the biometric information comprises vocalization-related muscle vibration information of the wearer, and determining whether the voice signal is from the wearer based on the biometric information comprises:

determining that the voice signal is from the wearer when the vocalization-related muscle vibration information indicates that vocalization-related muscles of the wearer vibrate.

7. The method of claim 6, wherein the vocalization-related muscle vibration information is detected by an inertial measurement unit configured to be attached to the vocalization-related muscles.

8. The method of claim 1, wherein determining, based on a detected voice signal, whether the voice signal is from the wearer of the wearable device comprises:

recognizing voiceprint information of the detected voice signal; and determining whether the voice signal is from the wearer based on voiceprint features of the wearer and recognized voiceprint information.

9. The method of claim 1, wherein the voice signal is a bone conduction voice signal, and the bone conduction voice signal is detected with a bone conduction voice detection apparatus configured to be attached to the wearer's head or neck, and determining, based on a detected voice signal, whether the voice signal is from the wearer of the wearable device comprises:

determining that the voice signal is a voice signal from the wearer of a wearable device when the bone conduction voice signal is not lower than a predetermined voice threshold.

10. The method of claim 1, wherein the biometric information comprises facial muscle movement information of the wearer, and determining whether the voice signal is from the wearer based on the biometric information comprises:

determining that the voice signal is from the wearer when the facial muscle movement information of the wearer indicates that vocalization-related facial muscles of the wearer move.

11. The method of claim 10, wherein acquiring vocalization-related biometric information of the wearer within a predetermined time period, which is before or after a time point when the voice signal is detected comprises:

acquiring facial structure information of the wearer within a predetermined time period, which is before the time point when the voice signal is detected;

establishing a 3D facial model of the wearer based on the facial structure information; and detecting the facial muscle movement information of the vocalization-related facial muscles of the wearer based on the 3D facial model.

12. The method of claim 11, wherein the facial muscle movement information is one of facial time of flight (ToF) information, facial ultrasound scan information, and facial structured light information.

13. A computing device, comprising:

at least one processor; and a memory configured to store executable instructions, which, when executed by the at least one processor, cause the at least one processor to perform a method for waking up a wearable device, comprising:

determining, based on a detected voice signal, whether the voice signal is from a wearer of the wearable device;

determining, based on the voice signal, whether the voice signal belongs to a conversation between the wearer and the wearable device with a speech classification model, wherein the speech classification model is trained by voice data samples comprising human-to-human conversations and human-machine interaction conversations and configured to perform classification prediction, wherein the voice data samples do not comprise a waking-up word for waking up the wearable device, wherein the human-machine interaction conversions differ from the human-to-human conversations in features including rhythm, loudness, and tone; and waking up the wearable device when the voice signal is from the wearer and the voice signal belongs to the conversation between the wearer and the wearable device, wherein determining, based on a detected voice signal, whether the voice signal is from a wearer of the wearable device comprises:

acquiring vocalization-related biometric information of the wearer within a predetermined time period, which is before a time point when the voice signal is detected; and determining whether the voice signal is from the wearer based on the biometric information.

14. The computing device of claim 13, wherein acquiring vocalization-related biometric information of the wearer within the predetermined time period, which is before the time point when the voice signal is detected comprises:

acquiring vocalization-related biometric information of the wearer within the predetermined time period, which is before the time point when the voice signal is detected, and the voice signal reaches a first threshold.

15. The computing device of claim 14, wherein the biometric information comprises a muscle electromyographic signal of the wearer, and determining whether the voice signal is from the wearer based on the biometric information comprises:

determining that the voice signal is from the wearer when the acquired muscle electromyographic signal is not lower than a predetermined electromyographic threshold.

16. The computing device of claim 15, wherein the speech classification model is configured to output probability that the detected voice signal belongs to the human-machine interaction conversations, and in response to that the probability output by the speech classification model is not lower than a predetermined probability threshold, it is determined that the voice signal belongs to the conversation between the wearer and the wearable device.

17. A non-transitory machine-readable store medium having stored therein executable instructions which, when executed, cause a machine to perform a method for waking up a wearable device, comprising:

acquiring vocalization-related biometric information of a wearer of the wearable device;

detecting a voice signal during a vocalization process of the wearer when the biometric information indicates that the wearer vocalizes;

determining, based on the voice signal, whether the voice signal belongs to a conversation between the wearer and the wearable device with a speech classification model, wherein the speech classification model is trained by voice data samples comprising human-to-human conversations and human-machine interaction conversations and configured to perform classification prediction, wherein the voice data samples do not comprise a waking-up word for waking up the wearable device, wherein the human-machine interaction conversions differ from the human-to-human conversations in features including rhythm, loudness, and tone; and waking up the wearable device when the voice signal detected in the vocalization process of the wearer belongs to the conversation between the wearer and the wearable device, wherein determining, based on a detected voice signal, whether the voice signal is from a wearer of the wearable device comprises:

acquiring vocalization-related biometric information of the wearer within a predetermined time period, which is before a time point when the voice signal is detected; and determining whether the voice signal is from the wearer based on the biometric information.

* * * * *